United States Patent [19]

Oyama et al.

[11] Patent Number: 4,478,075
[45] Date of Patent: Oct. 23, 1984

[54] AIR FLOW METER

[75] Inventors: Yoshishige Oyama, Katsuta; Hiroshi Kuroiwa, Hitachi; Yutaka Nishimura, Katsuta, all of Japan

[73] Assignee: Hitachi, Ltd., Tokyo, Japan

[21] Appl. No.: 449,617

[22] Filed: Dec. 14, 1982

[30] Foreign Application Priority Data

Dec. 18, 1981 [JP] Japan ................................. 56-203536

[51] Int. Cl.³ ............................ G01F 5/00; G01F 1/22
[52] U.S. Cl. ..................................... 73/118.2; 73/207
[58] Field of Search .............. 73/118 A, 204; 123/494

[56] References Cited

U.S. PATENT DOCUMENTS 4,121,549 10/1978 Martin .................................. 123/494
4,264,961 4/1981 Nishimura ......................... 73/204 X
4,381,667 5/1983 Sato .................................... 73/204 X Primary Examiner—John W. Caldwell, Sr.
Assistant Examiner—Ellwood G. Harding
Attorney, Agent, or Firm—Antonelli, Terry & Wands

[57] ABSTRACT

A part of the air flowing through a main passage flows into a by-pass passage. A flow rate detector is provided in the by-pass passage. An outlet of the by-pass passage is opened at the narrowest portion of a venturi structure provided in the main passage. The by-pass passage is in communication with a pressure-accumulating chamber, which is in communication with the main passage at the portion thereof which is on the downstream side of the venturi structure. The pressure of the air flowing backward from the engine is stored in the pressure-accumulating chamber. The pressure in the pressure-accumulating chamber serves as a passage resistance with respect to the flow of the air in the by-pass passage. Accordingly, the flow rate detector permits determining the flow rate of the air, which does not contain a component representative of a backward flow of the air.

14 Claims, 8 Drawing Figures

AIR FLOW METER

BACKGROUND OF THE INVENTION

This invention relates to an air flow meter, and more particularly to a thermal flow meter for use in determining the flow rate of suction air in an internal combustion engine for automobiles.

There are various kinds of known systems for determining the flow rate of suction air in an internal combustion engine. Among these systems, a system using a thermal air flow meter is widely employed for the following reasons: A thermal air flow meter generally has a high responding capability, and it permits determining the mass flow rate of the air, so that the compensation of air pressure is not required. Such a system is known from U.S. Pat. No. 3,747,577, U.S. Pat. No. 3,750,632 and U.S. Pat. No. 3,824,966. This known thermal flow meter consists of a platinum wire having a diameter of 70–100 μm provided in a suction pipe, which platinum wire serves as a velocity of flow detecting unit.

Besides the above system using a flow meter, a system is disclosed in U.S. Pat. No. 4,264,961 which uses a detecting unit consisting of a hollow ceramic support, a platinum wire wound around the support, and a layer of glass formed so as to cover the combination of the ceramic support and the platinum wire.

However, these thermal flow meters have the following problems. Namely, these flow meters are not capable of discriminating the direction, in which fluid flows in a tubular passage. Thus, even when fluid flows in a reverse direction in the passage, a signal which is identical with the signal generated when the fluid flows in a forward direction is outputted. When this flow meter is applied to an internal combustion engine, it is disposed between the air cleaner and the engine to determine the flow rate of the air sucked into the engine through the air cleaner. However, when the internal combustion engine is in a certain rotational condition, the air may be blown backward therefrom into the air cleaner in some cases. In such cases, the air blown backward is detected as a forward flow by the thermal flow meter, and a signal representative of a flow rate determined from the backwardly-blown air is outputted. Consequently, a measurement error occurs.

SUMMARY OF THE INVENTION

An object of the present invention is to provide an air flow meter capable of hydrodynamically determining the flow rate of the air, which corresponds to the difference obtained by subtracting the flow rate of the air at such time that if flows backward from that of the air at such time that it flows forward.

According to the present invention, a compensating means is provided on the downstream side of the by-pass passage which accommodates the air flow meter. The compensating means is operated by the pressure of the air at the time that if flows backward and is adapted to control the flow rate of the air in the by-pass passage while the air flows forward.

DESCRIPTION OF THE PREFERRED EMBODIMENTS

Figure 1:
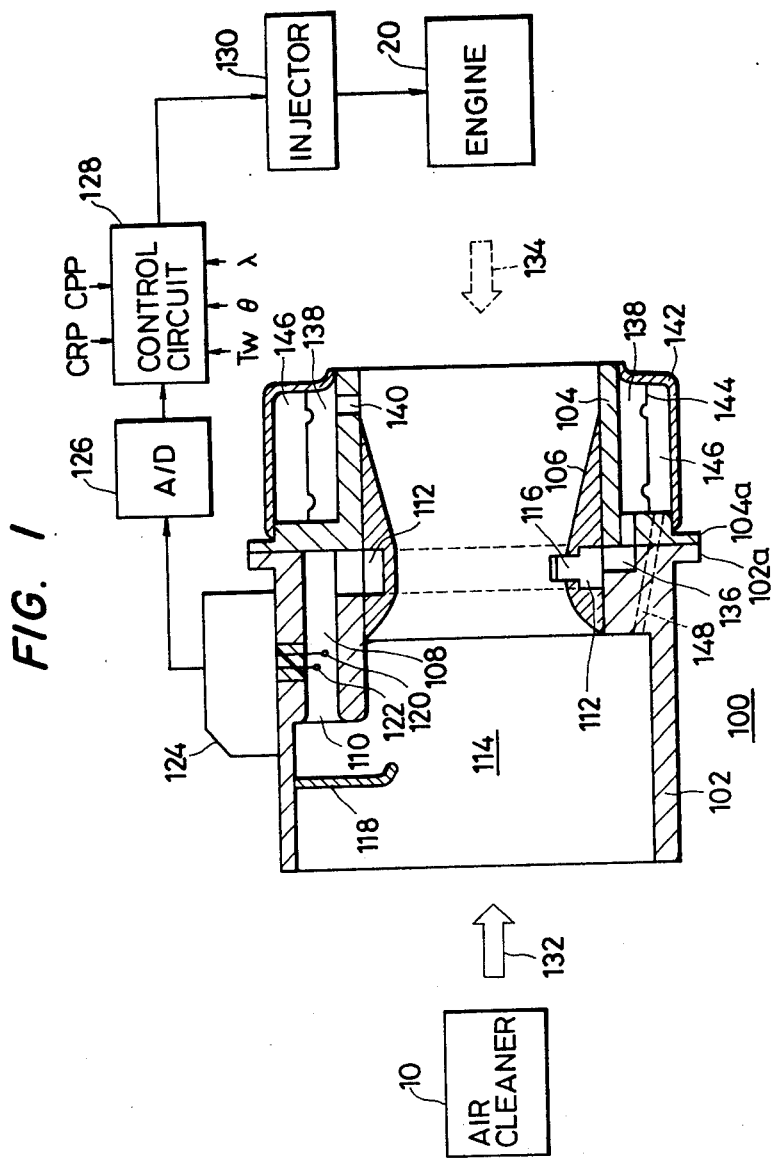
FIG. 1 is a schematic diagram of an embodiment of the present invention.

An embodiment of the present invention will be described with reference to FIG. 1.

The air to be supplied to an engine 2 is taken into a suction passage from an air cleaner 10 and is subjected to a measurement of the flow rate thereof in a flow meter 100. The flow meter 100 is constructed as follows. Suction cylinders 102, 104 consist of aluminum die castings, and are joined together at their respective flange portions 102a, 104a. A verturi structure 106, which also consists of an aluminum die casting, is inserted in the suction cylinders 102, 104. A by-pass passage 108 is formed in the suction cylinder 102. An inlet 110 of the by-pass passage 108 has a bell-mouthed shape, and is adapted to set the air current flowing thereinto. A passage 112 is formed between the venturi structure 106 and suction cylinder 102 to constitute a part of the by-pass passage 108. The passage 112 extends along the circumference of a main passage 114 for 180° and opens thereinto at a bore 116 formed in the narrowest portion of the venturi structure 106. Accordingly, the air taken into the suction passage from the air cleaner 10 is introduced separately into the main passage 114 and by-pass passage 108. The air flowing in the by-pass passage 108, which air is introduced thereinto from the inlet 110 thereof, is discharged from the rectangular bore 116 via the passage 112 to meet with the air flowing in the main passage 114. In this regard, the ratio of a flow rate of the air flowing in the by-pass passage 108 to that of the air flowing in the main passage 114 is set in advance to a predetermined level. A protective plate 118 is provided on the upstream side of the by-pass passage 108 to prevent dust from entering the by-pass passage 108. A thermal flow rate detector 120 and an air temperature compensating detector 122 are provided in the by-pass passage 108. Each of these detectors 120, 122 consists of a ceramic bobbin, a platinum wire wound around the ceramic bobbin, and glass coated on the outer surface of a combination of the ceramic bobbin and platinum wire. The details of these detectors are disclosed in U.S. application Ser. No. 230,804, filed on Feb. 2, 1981. Each of these detectors may be replaced by a thermal film type detector, of the type disclosed in U.S. application Ser. No. 387,527, filed on June 11, 1982, and which consists of a ceramic plate and a layer of platinum formed on the ceramic plate. A driving circuit for the flow rate detector 120 is provided in a case 124. This driving circuit is constructed as shown in, for example, FIG. 5 of U.S. Pat. No. 4,297,881. A signal representative of the flow rate of the air determined by this circuit is converted into a digital signal by an A/D converter 126. The digital signal is inputted into a control circuit 128. A signal Tw representative of the temperature of the cooling water and generated by a water temperature sensor, a signal θ representative of the degree of opening of the throttle valve and generated by a throttle detector, a signal λ representative of the air-fuel ratio and generated by an oxygen sensor, and two types of pulse signals CRP, CPP generated by a crank angle detector are also inputted into the control circuit 128. A fuel injection rate is calculated on the basis of these signals to feed the fuel to an injector 130 accordingly.

Letting $P_1$, $P_2$ equal the pressures at the inlet 110 and outlet 116 of the by-pass passage 108, the flow rate Q in the main passage 114 can be expressed by the equation, $$Q = A\sqrt{2g\gamma(P_1 - P_2)} \quad (1)$$

wherein A is a cross-sectional area of the narrowest portion of the venturi structure 106, g the dynamic acceleration, and γ the density of the fluid. In the above equation, the pressure $P_1$ is substantially equal to the atmospheric pressure, and is substantially at a constant level irrespective of the flow rate of the fluid. The pressure $P_2$ represents the characteristics of the square of the flow rate Q, and decreases as the flow rate Q increases. Namely, the pressure $P_2$ has a negative value with respect to the atmospheric pressure.

Letting q equal the flow rate of the air flowing in the by-pass passage 108, the flow rate q can be expressed by the following equation, $$q = a\sqrt{2g\gamma(P_1 - P_2)} \quad (2)$$

wherein a in a cross-sectional area of the narrowest portion of the by-pass passage 108. The narrowest portion usually corresponds to the inlet, outlet or a squeezed portion of the by-pass passage 108. In this embodiment, the narrowest portion corresponds to a portion which is on the downstream side of and a little way from the inlet 110, and which is provided with the detectors 120, 122.

When the equations (1) and (2) are rearranged, the flow rate Q can be expressed by the equation, $$Q = (A/a)q \quad (3)$$

Namely, when the flow rate q of the air flowing in the by-pass passage 108 is measured, the flow rate Q of the air flowing in the main passage 114 can be determined.

The above is a description of a method of determining the flow rate Q in the case where the air flows forward in the direction of the arrow 132, i.e. from the air cleaner 10 to the engine 20.

The flow rate of the air in the case where the air flows backward, i.e. in the direction of the arrow 134 is determined as follows. The pressure $P_2$ at the narrowest portion of the venturi structure 106, in which portion the outlet 116 of the by-pass passage 108 is formed, is lower than the pressure $P_1$ at the inlet 110 of the by-pass passage 108. Accordingly, the air does not flow from the outlet 116 to the inlet 110, and so, the flow rate q in the by-pass passage 108 at such time that the air flows backward becomes zero. Therefore, the backward flow of the air is not sensed by the detector 120.

The flow meter according to the present invention further has the following structure for hydrodynamically compensating the flow rate of the air at such time that it flows backward. The by-pass passage 108 is in communication with a pressure-accumulating chamber 138 via a passage 136. A case 142 is fixedly provided around the main passage 114. The space between the case 142 and suction cylinder 104 is divided by a diaphragm 144. The pressure-accumulating chamber 138 is in communication with the main passage 114 via a bore 140. The bore 140 is formed on the downstream side of the outlet 116 of the by-pass passage 108. A space 146 separated from the pressure-accumulating chamber 138 by the diaphragm 144 in communication with the main passage 114 via a pasage 148. While the air flows backward, a pressure occurring due to the backward flow of the air is stored in the pressure-accumulating chamber 138. While the air flows forward, the pressure thus stored is discharged from the outlet 116 of the by-pass passage 108 via the passage 136. According, the flow rate of the air corresponding to the difference which is obtained by substrating the flow rate of the air at such time that it flows backward from the flow rate of the air at such time that it flows forward can be determined. The principle of this operation will be described with reference to FIG. 2.

Figure 2:
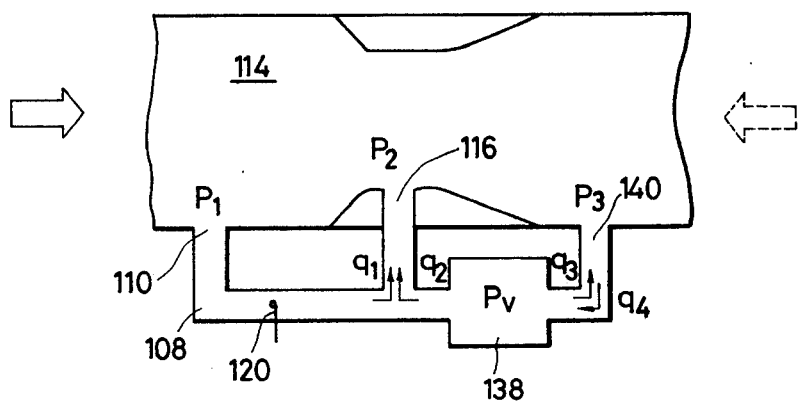
FIG. 2 illustrates the principle of the embodiment of the present invention.

FIG. 2 is diagram showing the operation of the embodiment shown in FIG. 1. Such reference numerals in FIG. 2 that are identical with those in FIG. 1 designate the same parts. Reference symbol $P_1$ denotes the pressure of the air at the inlet 110 of the by-pass passage 108, $P_2$ the pressure at the outlet 116 of the by-pass passage 108, $P_3$ the pressure at the bore 140, and Pv the pressure in the pressure-accumulating chamber 138. Reference symbol $q_1$ denotes the flow rate of the air flowing from the inlet 110 of the by-pass passage 108 to the outlet 116 thereof, $q_2$ the flow rate of the air flowing from the pressure-accumulating chamber 138 to the outlet 116 of the by-pass passage 108, and $q_3$ the flow rate of the air flowing from the pressure-accumulating chamber 138 to the bore 140.

First, the operation of the embodiment in a regular case, in which the air flows forward, will be described. While the air flows forward, the pressure $P_1$ is substantially equal to the atmospheric pressure. The pressure $P_2$ decreases as the flow rate of the air increases. The pressure $P_3$ is substantially equal to the atmospheric pressure, as the pressure $P_1$. Accordingly, both of the flow rates $q_2$, $q_3$ are zero. Consequently, the flow rate $q_1$ of the air flowing in the by-pass passage 108 varies in accordance with a difference between the pressures $P_1$, $P_2$ as may be understood from the above quation (2)

$$P_1 = P_3 \approx \text{atmospheric pressure}, \quad P_2 < P_1$$

$$q_2 = q_3 = 0, \quad q_1 = a\sqrt{2g\gamma(P_1 - P_2)}.$$

Next, the operation of the embodiment in the case where the air flows backward will be described. Since the venturi structure is used, the pressure $P_1$ in this case is substantially equal to the atmospheric pressure. The pressure $P_2$ is lower than the pressure $P_1$. Accordingly, the flow rate $q_1$ is zero. The pressure $P_3$ is higher than the pressure $P_2$. Letting G' equal the flow rate of a backward flow of the air, the pressure $P_3$ can be expressed by the following equation;

$$P_3 = K \cdot (G'^2 / 2g)$$

wherein k is a constant and g the dynamic acceleration. On the other hand, the pressure Pv of the air at such time that it flows backward varies in accordance with the following equation.

$$V \cdot \frac{dPv}{dt} = \epsilon \sqrt{P_3}$$

wherein V is the volume of the pressure-accumulating chamber; and ε is a constant. The above equation is approximated as follows.

$$V \frac{dPv}{dt} \approx \epsilon \sqrt{P_3}$$

$$\approx \epsilon \sqrt{\frac{k}{2g} \cdot G'}$$

Consequently, $$V \cdot dPv \approx \epsilon \sqrt{\frac{K}{2}} \cdot G' \cdot dt.$$

The above equation shows that the time integration of the flow rate $G'$ of the air flowing backward equals the pressure Pv. Therefore, the higher the pressure Pv is, the higher will be the integration value of the flow rate $G'$ of the air flowing backward.

A case where the air flows forward after it stops flowing backward will now be described. Pressures $P_1$, $P_3$ are equal to each other and substantially equal to the atmospheric pressure. The pressure $P_2$ becomes lower than the pressure $P_1$, and the pressure Pv, which is accumulated as mentioned above, has a value greater than that of the pressure $P_1$.

$P_1 = P_3 \approx$ atmospheric pressure $P_2 < P_1$, $Pv > P_1$.

In the meantime, the flow rate of the air flowing out from the outlet 116 is equal to the sum of the flow rates $q_1$, $q_2$ and is determined by the pressures $P_1$, $P_2$.

$$q_1 + q_2 = a\sqrt{2g\gamma(P_1 - P_2)}.$$

Since the pressure Pv is higher than the pressure $P_1$, the flow rate $q_2$ is not zero but has a predetermined value. Accordingly, the flow rate $q_1$ decreases by an amount corresponding to the flow rate $q_2$. The reduced flow rate $q_1$ is determined by the detector 120. Therefore, the value of the flow rate $q_1$ is equal to the difference obtained by subtracting the flow rate of the air at such time that it flows backward from the flow rate of the air at such time that it flows forward. The explanation is that the air flows at a flow rate $q_2$ for a period of time, during which the pressure Pv in the pressure-accumulating chamber is changed from the level of the pressure of the air accumulated therein due to a backward flow of the air to a level equal to that of the atmospheric pressure, which is equal to the pressure $P_3$. The product $q_2 \cdot t$ of the above-mentioned time t the flow rate $q_2$ is proportional to the pressure Pv. The flow rates $q_2$, $q_3$ are equal to each other.

Even if the volume of the pressure-accumulating chamber 138 is reduced due to the use of the diaphragm 144 therein, a pressure corresponding to $G' \cdot t$ can be stored.

The pressure $P_1$ is introduced into the chamber 146, which is on the other side of the diahragm 144, via the passage 148. Accordingly, the difference (Pv − $P_1$) between the pressures Pv, $P_1$ can be prevented from varying depending upon the pressure $P_1$. Therefore, even when the pressure $P_1$ decreases due to clogging of the air cleaner, the influence thereof can be eliminated.

Figure 3:
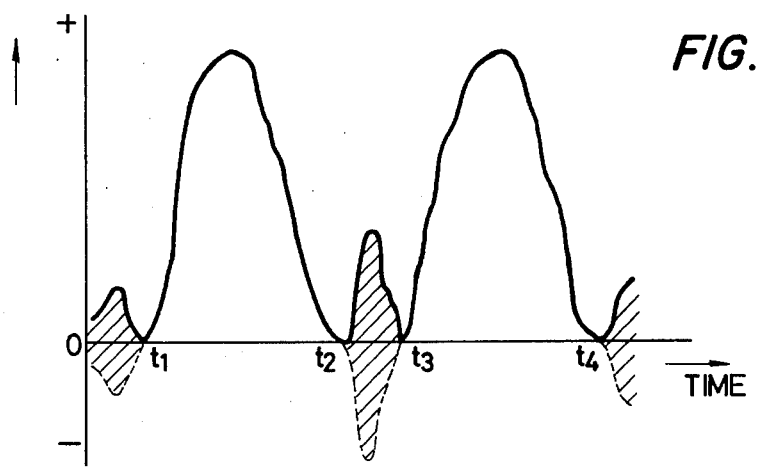
FIG. 3 is a graph showing an operation of a conventional air flow meter.

The effect of the above-described embodiment will be described with reference to FIGS. 3-5. FIG. 3 shows the waveform of an output signal from a driving circuit for a flow rate detector in a conventional air flow meter. The axis of abscissas represents time. The output signal varies as shown in full line synchronously with variations in the crank angle of the engine. Since the conventional flow detector is not capable of discriminating a forward flow of the air from a backward flow thereof, an error-containing signal is outputted during a period of time between, for example, instants $t_2$, $t_3$ as the flow rate of the air varies due to a backward flow of the air.

Figure 4:
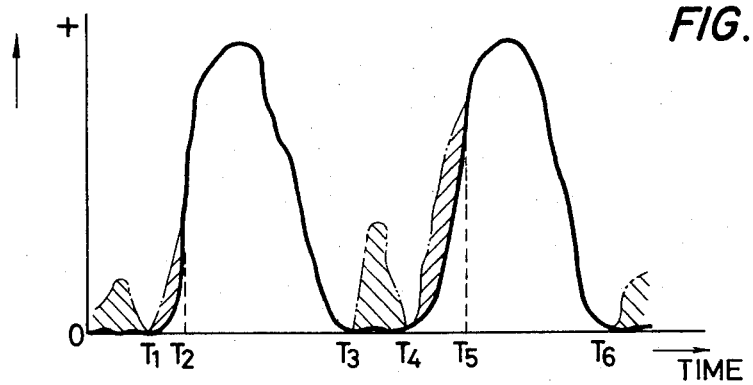
FIG. 4 is a graph showing an operation of the embodiment of the present invention.

FIG. 4 shows the waveform of an outut from a driving circuit for a flow rate detector in an embodiment of the present invention, and what is shown in full line represents the output signal. In this output signal, errors, i.e. the hatched portions of the signal shown in FIG. 3 are eliminated. Namely, a component of the signal, which is representative of the flow rate of the air at such time that it flows backward, does not appear in the period of time between, for example, the instants $T_3$, $T_4$. This is ascribed to the provision of the outlet of the by-pass passage in the narrowest portion of the venturi structure. Between the instants $T_4$, $T_5$, the level of the output signal is decreased by an amount corresponding to that of the hatched portion of the signal as compared with such a portion of the signal shown in FIG. 3 that is between the corresponding instants. The above-mentioned descrease in the level of the output signal occurs since such a component of the signal that represents a backward flow of the air can be eliminated by utilizing the pressure-accumulating chamber. The difference between the length of time between the instants $T_1$, $T_2$ and that between the instants $T_4$, $T_5$ is based on the difference between the flow rate of a backward flow of the air occurring between the instants $T_3$, $T_4$ and that of a backward flow of the air occurring before the instant $T_1$.

Figure 5:
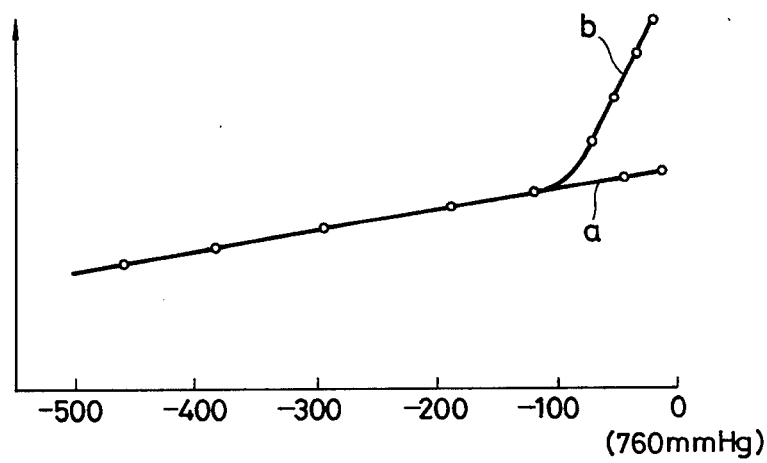
FIG. 5 is a graph showing the operational characteristics of the embodiment of the present invention in comparison with those of a conventional air flow meter.

FIG. 5 shows outputs from the driving circuits for the flow rate detectors in the conventional air flow meter and the embodiment of the present invention. The axis of ordinates of the drawing represents outputs from these flow rate detectors, and the axis of abscissas thereof manifold pressures. The manifold pressures are shown in terms of vacuums with respect to the atmospheric pressure. 0 mmHg represents the atmospheric pressure. In FIG. 5, average levels of outputs from the flow rate detectors, which are determined by varying manifold pressures with a 4-cycle, 4-cylinder, 2000 cc engine rotated at 1500 r.m.p., are plotted. The curve b in the drawing represents outputs from the flow rate detector in the conventional flow meter. Referring to the curve b, the indication value between −100 mmHg–0 mmHg increases to a great extent in comparison with an actual flow rate of the air. This is based on an error due to a backward flow of the air. On the other hand, a line a represents outputs from the flow rate detector in the embodiment of the present invention.

The volume of the pressure-accumulating chamber 138 will now be described. It is necessary that the volume of the chamber 138 corresponds to the amount of the backwardly-flowing air. The time, during which the air flows backward, for example, the time between the instants $T_3$, $T_4$, becomes longer as the number of revolutions per minute of the engine decreases. For example, when the engine is rotated at 1000 r.p.m. the backward flow of the air continues for around 10 ms, and, when the engine is rotated at 2000 r.p.m., the backward flow of the air continues for around 3 ms. The length of such time is greater in the case of an engine, in which the overlapping time, during which both the suction valve and exhaust valve are opened, is long. Accordingly, it is necessary that the volume of the pressure-accumulating chamber be determined in accordance with the flow rate of the air at such time that it flows backward with the engine rotated at a low rate. The pressure-accumulating chamber generally requires a volume of around 100-200 cc.

Figure 6:
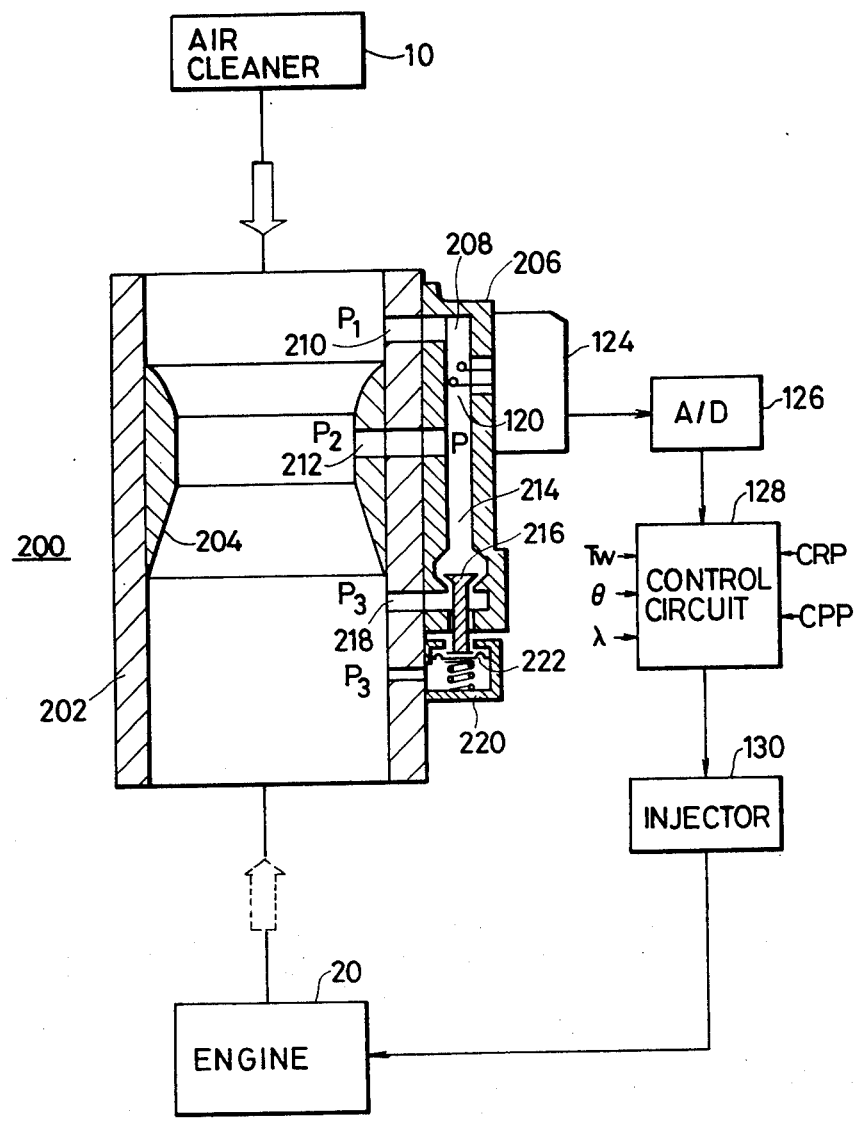
FIG. 6 is a schematic diagram of another embodiment of the present invention.

Another embodiment of the present invention will be described with reference to FIG. 6. The same reference numerals used in FIGS. 6 and 1 designate the same parts. A flow meter 200 is constructed as follows. A venturi structure 204 is inserted in a suction cylinder 202 consisting of an aluminum die casting. A by-pass passage unit 206 is provided on an outer surface of the suction cylinder 202. A passage 208 is formed in the by-pass passage unit 206 so as to be in communication with the suction cylinder 202 via bores 210, 212. The bore 210 constitutes an inlet of the by-pass passage 208, and the bore 212 an outlet thereof. The by-pass passage unit 206 is further provided with an auxiliary passage 214, which is in communication with the by-pass passage 208. The auxiliary passage 214 is provided with a valve 216 therein and communicates with the suction cylinder 202 via a bore 218. The cross-sectional area of the opening of the valve 216 is regulated by a valve control unit 220. The interior of the valve control unit 220 is partitioned by a diaphragm 222, to which a shaft of the valve 216 is fixed. The atmospheric pressure is applied to one side of the diaphragm 222, and the pressure $P_3$ in the suction cylinder 202 to the other side thereof.

Figure 7:
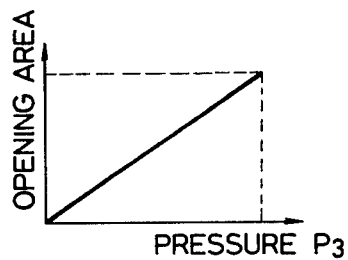
FIGS. 7 and 8 are graphs showing an operation of the second embodiment of the present invention.

In the case where the air flows forward, i.e. from an air cleaner 10 into an engine 20 via the flow meter 200, the pressure $P_3$ is substantially equal to the atmospheric pressure, and the pressures on both sides of the diagragm 222 are equal to each other. Accordingly, the valve 216 remains closed. On the other hand, when the air flows backward from the engine 20, the pressure $P_3$ becomes higher than the atmospheric pressure. The relation between the pressure $P_3$ and the cross-sectional area of the opening of the valve 216 is as shown in FIG. 7.

Figure 8:
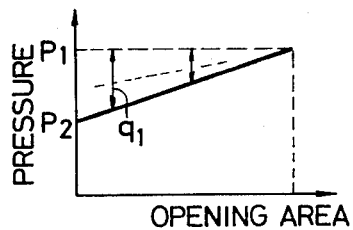

Let P equal the pressure at the joint portions of the by-pass passage 208 and auxiliary passage 214. When the valve 216 is closed, the pressure P is substantially equal to the pressure $P_2$. As the cross-sectional area of the opening of the valve 216 increases, the pressure P increases. The relation described above between the pressure P and the cross-sectional area of the opening of the valve 216 is shown in FIG. 8.

The flow rate $q_1$ of the air flowing near the flow rate detector 120 varies in accordance with the difference between the pressure $P_1$ at the outlet of the by-pass passage and the pressure P mentioned above. Accordingly, the flow rate $q_1$ decreases as the cross-sectional area of the opening of the valve 216 increases, as shown in FIG. 8. Since the cross-sectional area of the opening of the valve 216 varies in proportion to the flow rate of the backwardly flowing air, the flow rate measured by the flow rate detector decreases in accordance with the flow rate of the backwardly-flowing air. Therefore, the signal component representative of the flow rate of the backwardly-flowing air can be eliminated.

We claim:

1. An air flow meter for an internal combustion engine comprising means forming a main passage for intake air provided between an air cleaner and said internal combustion engine, a venturi structure provided in said main passage, a by-pass passage formed with an inlet positioned in said main passage so as to permit a part of the air flowing in said main passage to enter the by-pass passage and having at the portion of said main passage which corresponds to the narrowest portion of said venturi structure an outlet from which the air flows out into said main passage, a flow rate detector provided in said by-pass passage to determine the flow rate of the air flowing therein, and compensating means connected to said by-pass passage between a first position located between said flow rate detector and said outlet of said by-pass passage and a second position on the downstream side of said venturi structure for controlling the flow rate of the air flowing from the inlet of said by-pass passage toward said flow rate detector during one portion of the cycle of said internal combustion engine in accordance with the flow rate of air flowing backward from said internal combustion engine toward said air cleaner during another portion of the cycle of said internal combustion engine.

2. An air flow meter according to claim 1, wherein said compensating means consists of a pressure-accumulating chamber in communication with said main passage at the portion thereof which is on the downstream side of said venturi structure, said pressure-accumulating chamber being adapted to store therein a pressure corresponding to the flow rate of the air flowing backward from said internal combustion engine, the pressure in said pressure-accumulating chamber being discharged to the portion of the interior of said by-pass passage which is between the position, in which said flow rate detector is provided, and said outlet of said by-pass passage when the air flows forward from said air cleaner to said internal combustion engine.

3. An air flow meter according to claim 1, wherein said compensating means consists of a chamber, the interior of which is partitioned by a diaphragm. one of the spaces in said chamber being in communication with said by-pass passage and said main passage at the portion thereof which is on the downstream side of said venturi structure.

4. An air flow meter according to claim 3, wherein the other space in said chamber is in communicaiton with said main passage at the portion thereof which is on the upstream side of said venturi structure.

5. An air flow meter according to claim 3, wherein said chamber is formed between said main passage and a case formed around said main passage, said diaphragm being fixed between said main passage and said case so as to surround said main passage.

6. An air flow meter according to claim 1, wherein said compensating means consists of said by-pass passage, an auxiliary passage connecting said by-pass passage to the portion of said main passage which is on the downstream side of said venturi structure, a valve provided in said auxiliary passage, and a member for controlling the degree of opening of said valve in accordance with the difference between the atmospheric pressure and a pressure in the portion of said main passage which is on the downstream side of said venturi structure.

7. An air flow meter for an internal combustion engine comprising means forming a main passage for intake air provided between an air cleaner and said internal combustion engine, a venturi structure provided in said main passage, a by-pass passage formed with an inlet positioned in said main passage to permit a part of the air flowing in said main passage to enter the by-pass passage and having at the portion of said main passage which corresponds to the narrowest portion of said venturi structure an outlet from which the air flows out into said main passage, a flow rate detector provided in said by-pass passage to determine the flow rate of the air flowing therein, accumulating means coupled to said by-pass passage and said main passage for accumulating pressure from a point in said main passage downstream of said venturi structure during a portion of the cycle of said internal combustion engine in which air flows backward from said internal combustion engine toward said air cleaner, and means for applying said accumulated pressure from said accumulating means to said by-pass passage to reduce the flow rate of air flowing therein toward said flow rate detector during another portion of the cycle of said internal combustion engine in which air flows from said air cleaner toward said internal combustion engine through said main passage.

8. An air flow meter according to claim 7, wherein said accumulating means includes a diaphragm chamber connected to said main passage on the downstream side of said venturi structure and being dimensioned to have a volume corresponding to the quantity of backwardly-flowing air during each cycle of the internal combustion engine at low speeds of the engine.

9. An air flow meter according to claim 7, wherein said diaphragm chamber is also connected to said by-pass passage at a position between said flow rate detector and said outlet by said means for applying said accumulated pressure to said by-pass passage.

10. An air flow meter according to claim 7, wherein said accumulating means includes a chamber, the interior of which is partitioned by a diaphragm to form two spaces, one of said spaces being in communication with said main passage downstream of said venturi structure and with said by-pass passage downstream of said flow rate detector, and the other space being in communication with said main passage upstream of said venturi structure.

11. An air flow meter for an internal combustion engine comprising means forming a main passage for intake air provided between an air cleaner and said internal combustion engine, a venturi structure provided in said main passage, a by-pass passage formed with an inlet positioned in said main passage to permit a part of the air flowing in said main passage to enter the by-pas passage and having at the portion of said main passage which corresponds to the narrowest portion of said venturi structure an outlet from which the air flows out into said main passage, a flow rate detector provided in said by-pass passage to determine the flow rate of the air flowing therein, and compensating means responsive to the pressure in said by-pass passage and said main passage at the downstream side of said venturi structure for controlling the flow rate of the air flowing in said by-pass passage toward said flow rate detector to a value corresponding to the difference between the flow rate of air flowing from said air cleaner toward said internal combustion engine during one portion of the cycle of said engine and the flow rate of the air flowing from said internal combustion engine toward said air cleaner during another portion of the cycle of said engine.

12. An air flow meter according to claim 11, wherein said compensating means consists of a chamber, the interior of which is partitioned by a diaphragm, one of the spaces in said chamber being in communication with said by-pass passage and said main passage at the portion thereof which is on the downstream side of said venturi structure.

13. An air flow meter according to claim 12, wherein the other space in said chamber is in communication with said main passage at the portion thereof which is on the upstream side of said venturi structure.

14. An air flow meter according to claim 11, wherein said compensating means consists of said by-pass passage, an auxiliary passage connecting said by-pass passage to the portion of said main passage which is on the downstream side of said venturi structure, a valve provided in said auxiliary passage, and a member for controlling the degree of opening of said valve in accordance with the difference between the atmospheric pressure and a pressure in the portion of said main passage which is on the downstream side of said venturi structure.

* * * * *